(12) United States Patent
Tseng et al.

(10) Patent No.: US 8,218,062 B2
(45) Date of Patent: Jul. 10, 2012

(54) PHOTOGRAPHING MODULE

(75) Inventors: Te Sheng Tseng, Taichung (TW); Chen Yi Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 290 days.

(21) Appl. No.: 12/656,918

(22) Filed: Feb. 19, 2010

(65) Prior Publication Data

US 2011/0063495 A1 Mar. 17, 2011

(30) Foreign Application Priority Data

Sep. 15, 2009 (TW) ................................ 98131022 A

(51) Int. Cl.
*H04N 5/232* (2006.01)
*H04N 5/225* (2006.01)
*G02B 27/00* (2006.01)
*G03B 3/10* (2006.01)

(52) U.S. Cl. ......... 348/345; 348/373; 359/813; 396/133

(58) Field of Classification Search .................. 348/345, 348/240.99, 240.3, 373; 396/133; 359/813, 359/814, 819

See application file for complete search history.

(56) References Cited

U.S. PATENT DOCUMENTS

| 5,970,602 | A | * | 10/1999 | Harada et al. ............... 29/603.06 |
| 7,595,944 | B2 | * | 9/2009 | Huang et al. .................. 359/814 |
| 7,871,207 | B2 | * | 1/2011 | Akabane et al. .............. 396/439 |
| 2007/0166022 | A1 | * | 7/2007 | Lai ................................ 396/133 |
| 2007/0285558 | A1 | * | 12/2007 | Oohara et al. ................ 348/345 |
| 2009/0141373 | A1 | * | 6/2009 | Tang ............................ 359/819 |
| 2011/0052164 | A1 | * | 3/2011 | Huang et al. .................... 396/55 |

* cited by examiner

*Primary Examiner* — Nhan T Tran

(74) *Attorney, Agent, or Firm* — Bacon & Thomas, PLLC

(57) ABSTRACT

This invention provides a photographing module at least including an electrically controlled actuator, an elastic member, and a photo sensor. The electrically controlled actuator at least comprises a fixed element, a movable element, and an electrical unit and at least provides an axial displacement, wherein the movable element is connected to the lens unit and the electrical unit electrically communicates with the elastic member. The elastic member at least comprises a fixed portion, a movable portion, an elastic portion, and a pair of power supply terminals, wherein the fixed portion and the movable portion are respectively connected to the fixed element and the movable element. The photo sensor is positioned on an image side of the photographing module and connected to the fixed member. The various portions of the elastic member may have different thicknesses depending on desired stiffness of each portion, such that the elastic member is thinned so as to facilitate miniaturization of the photographing module.

14 Claims, 8 Drawing Sheets

PHOTOGRAPHING MODULE

BACKGROUND OF THE INVENTION

1. Field of the Invention

The present invention relates to a photographing module that includes an electrically controlled actuator, and more particularly, to a photographing module whose electrically controlled actuator uses a voice coil motor (VCM) structure.

2. Description of the Related Art

There are many electronic devices that require the installation of an actuator, such as mobile phones with vibration function, magnetic heads having a linear actuator, autofocus photographing modules, etc. For these devices, voice coil motors (VCMs) are the most common type of actuators used within. Since VCMs are not expensive and are able to achieve a precise movement, they are suitable short-range microactuators for use with electronic devices.

Referring to FIG. 1, a front view of a prior art photographing module 7 is shown. The photographing module 7 includes: a lens unit 8, an electrically controlled actuator 9 connected to the lens unit 8, an elastic member 10 connected to the electrically controlled actuator 9, an insulating piece 11 positioned above the elastic member 10, a pair of power supply terminals 12 soldered to the elastic member 10, and a photo sensor 13 positioned under the electrically controlled actuator 9. The electrically controlled actuator 9 comprises a fixed element 91, a movable element 92 positioned on the fixed element 91, and an electrical unit 93 positioned around the outside of the movable element 92. FIG. 2 shows a top view of a prior art elastic member 10 as described above, which comprises a fixed portion 101, an elastic portion 102 linked to the fixed portion 101, and a movable portion 103 linked to the elastic portion 102. As shown in FIG. 1, the elastic member 10 and the insulating piece 11 are positioned sequentially between the fixed element 91 and the movable element 92 of the electrically controlled actuator 9. The insulating piece 11 prevents the elastic member 10 from electrically communicating with other metal components; moreover, the insulating piece 11 provides additional strength to press on the elastic member 10 so that it can be secured at a proper position.

The fixed portion 101 of the elastic member 10 is connected to the fixed element 91 of the actuator 9. The movable portion 103 of the elastic member 10 is connected to the movable element 92 of the actuator 9. While the pair of power supply terminals 12 and the elastic member 10 are soldered together, the elastic member 10 also electrically communicates with the electrical unit 93 of the actuator 9 to transmit electricity thereto. The photo sensor 13 is positioned on the image side of the photographing module 7 and connected to the fixed element 91 of the actuator 9. When an external power source (not shown) is coupled to the pair of power supply terminals 12, power will flow sequentially through the terminals 12 and the elastic member 10 to the electrical unit 93 of the actuator 9, thereby leading to an axial displacement of the movable element 92. This axial displacement of the movable element 92 enables the lens unit 8 to move linearly along the optical axis and also enables the movable portion 103 of the elastic member 10 to move, further leading to a linear displacement of the elastic portion 102.

FIG. 3 shows a top view of another prior art elastic member 14. A pair of power supply terminals 144 is formed integrally into the elastic member 14 to become one piece; hence, the step in which terminals 144 are soldered to the elastic member 14 can be eliminated. The elastic member 14 comprises a fixed portion 141, an elastic portion 142, a movable portion 143, and a pair of power supply terminals 144.

Both of the prior art elastic members 10 and 14 described above are flat springs with an even thickness. As miniaturization is a continuing trend in the production of electronic products, components like the elastic members 10 and 14 may be required to have smaller spring constants and their thicknesses will become smaller as a result. However, as the spring constant of an elastic member reduces, so does its stiffness; in consequence, the elastic member tends to rupture more easily. It is thus important to manage the balance between the spring constant and the stiffness of an elastic member, particularly in a design where the elastic member and power supply terminals are combined together. In this kind of design, generally, the elastic member is expected to have a relatively small spring constant; however, this may lead to a small stiffness for the power supply terminals. Since power supply terminals may have to be bent during assembly, they will be subject to rupture more easily with a small stiffness, thereby causing wastes that increase the production cost. Moreover, as the elastic member 14 and the power supply terminals 144 both become thinner, poor electrical contact between the terminals 144 and an external power source tend to happen more frequently.

As such, there exists a need in the art to develop an improved elastic member that has a reduced thickness and overcomes the drawback of rupturing easily and poor electrical contact occurring to the power supply terminals on the elastic member. Such an improved elastic member may effectively lower the production cost accordingly.

SUMMARY OF THE INVENTION

An object of the present invention is to provide a photographing module that includes a lens unit, an electrically controlled actuator, an elastic member, and a photo sensor. The various portions of the elastic member have different thicknesses depending on desired stiffness of each portion, such that the elastic member is thinned so as to facilitate miniaturization of the photographing module. The needs to have an elastic member with desired stiffness and to provide good electrical contact are both met by a photographing module of the present invention.

To achieve the above object, the present invention provides a photographing module at least including a lens unit, an electrically controlled actuator, an elastic member, and a photo sensor. The lens unit at least comprises one lens element. The electrically controlled actuator at least comprises: a fixed element; a movable element positioned within the fixed element, having a hollow central portion around an optical axis and connected to the lens unit; and an electrical unit positioned around the outside of the movable element. The elastic member at least comprises: a fixed portion; a movable portion; an elastic portion linked between the fixed portion and the movable portion; and a pair of power supply terminals linked to the fixed portion. The photo sensor is positioned on an image side of the photographing module and connected to the fixed member of the electrically controlled actuator. In the photographing module of the present invention, the elastic member is positioned between the fixed element and the movable element of the actuator; the elastic member electrically communicates with the electrical unit of the actuator; the fixed portion of the elastic member is connected to the fixed element of the actuator; the movable portion of the elastic member is connected to the movable element of the actuator; and the thickness of the fixed portion is different from that of the elastic portion. When power from an external power source is input to the electrical unit through the pair of power supply terminals, an axial displacement of the movable element of the actuator is generated, which enables the lens unit to move linearly along the optical axis; the displacement of the movable element also enables the movable portion of the elastic member to move, which leads to a linear displacement of the elastic portion.

The present invention further provides a photographing module at least including an electrically controlled actuator, an elastic member, and a photo sensor. The electrically controlled actuator at least comprises: a fixed element; a movable element positioned within the fixed element and at least comprising one lens element; and an electrical unit positioned around the outside of the movable element. The elastic member at least comprises: a fixed portion; a movable portion; an elastic portion linked between the fixed portion and the movable portion; and a pair of power supply terminals linked to the fixed portion. The photo sensor is positioned on an image side of the photographing module and connected to the fixed member of the electrically controlled actuator. In the photographing module of the present invention, the elastic member is positioned between the fixed element and the movable element of the actuator; the elastic member electrically communicates with the electrical unit of the actuator; the fixed portion of the elastic member is connected to the fixed element of the actuator; the movable portion of the elastic member is connected to the movable element of the actuator; and the thickness of the fixed portion is different from that of the elastic portion. When power from an external power source is input to the electrical unit through the pair of power supply terminals, the moveable element of the actuator is enabled to move linearly along the optical axis, and a linear displacement of the elastic portion of the elastic member is generated.

DETAILED DESCRIPTION OF THE PREFERRED EMBODIMENTS

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

Figure 1:
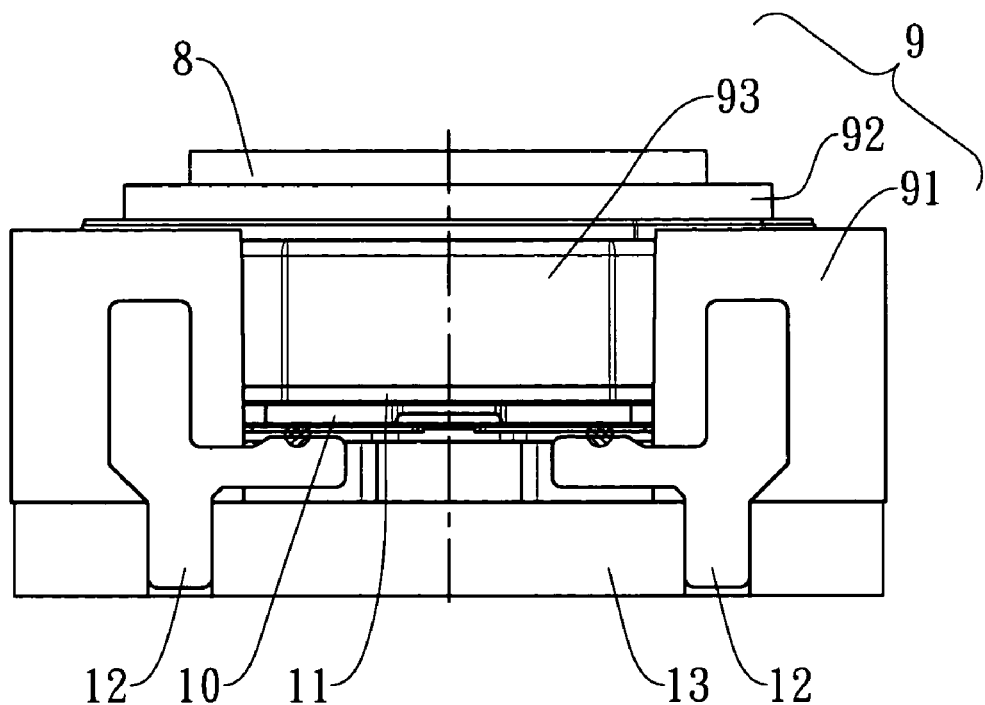
FIG. 1 shows a front view of a prior art photographing module.
Figure 2:
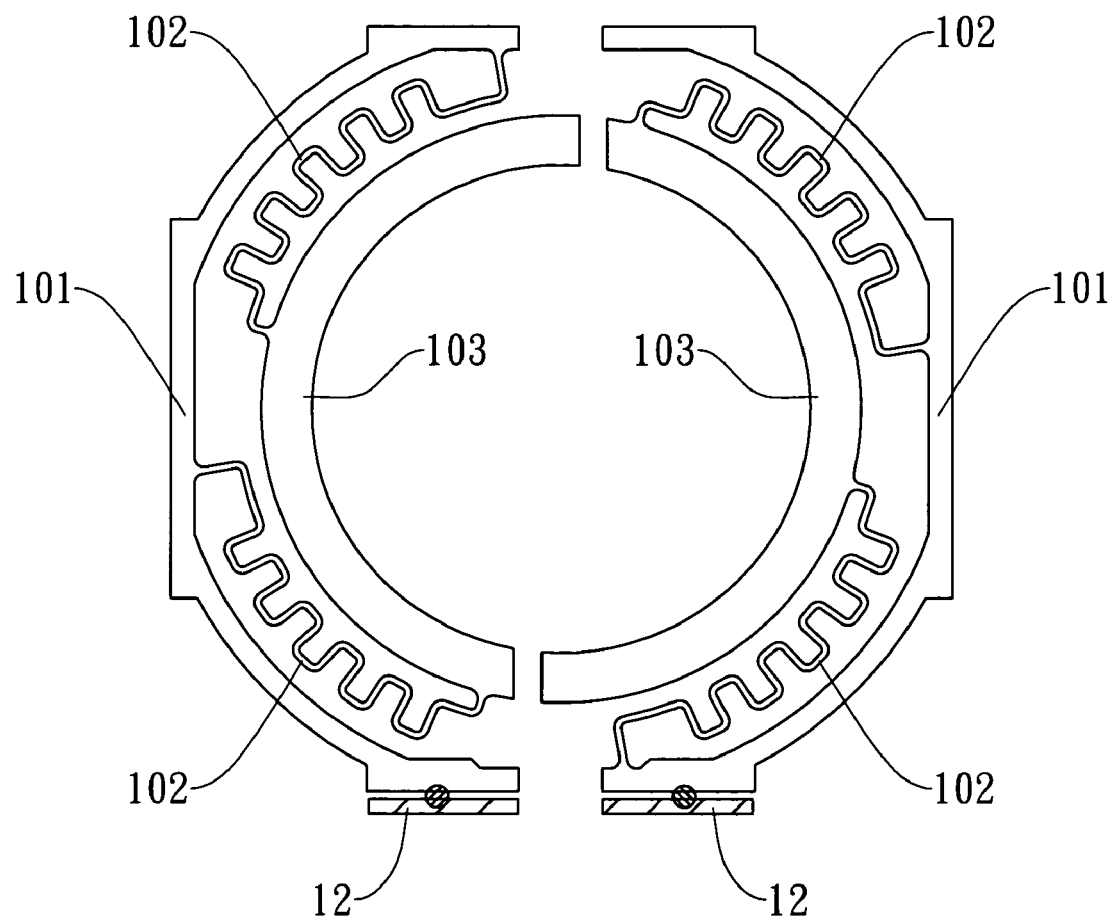
FIG. 2 shows a top view of a prior art elastic member from the photographing module in FIG. 1.
Figure 3:
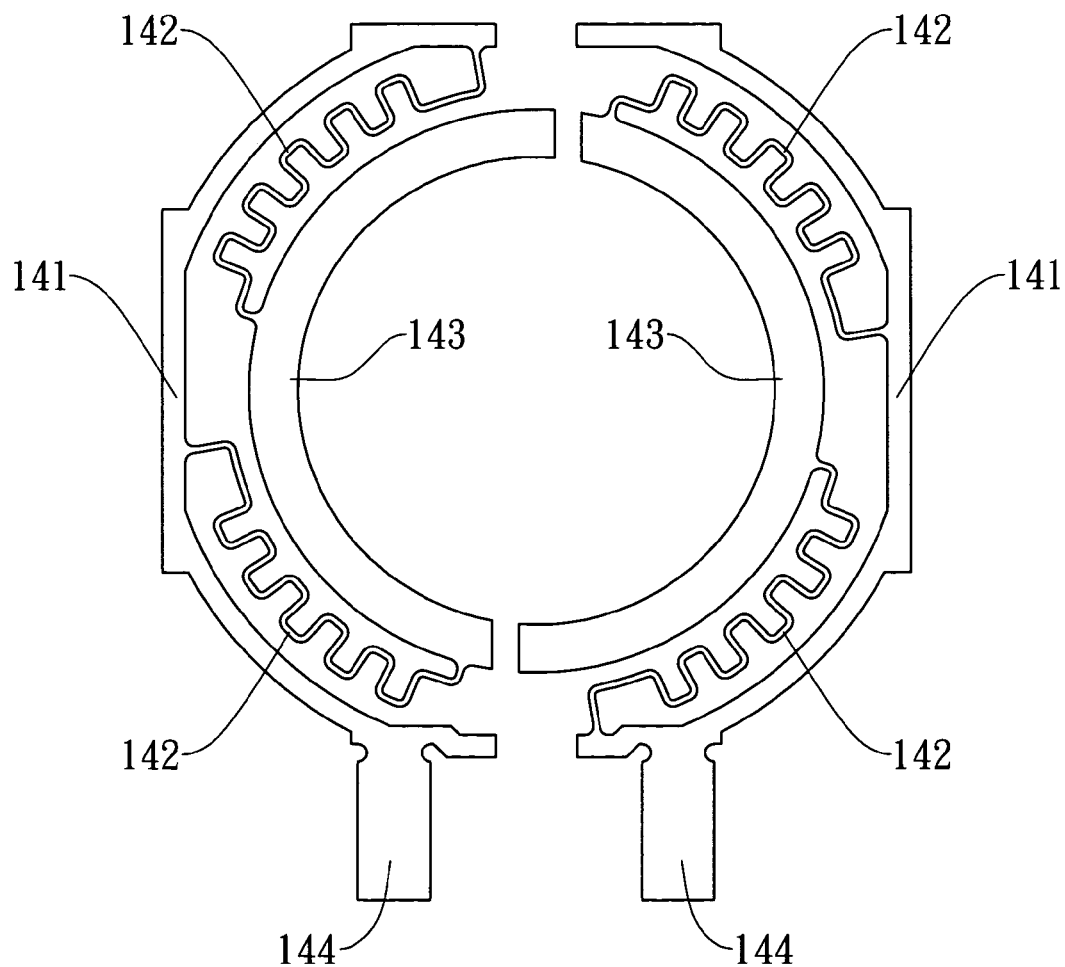
FIG. 3 shows a top view of another prior art elastic member.
Figure 4:
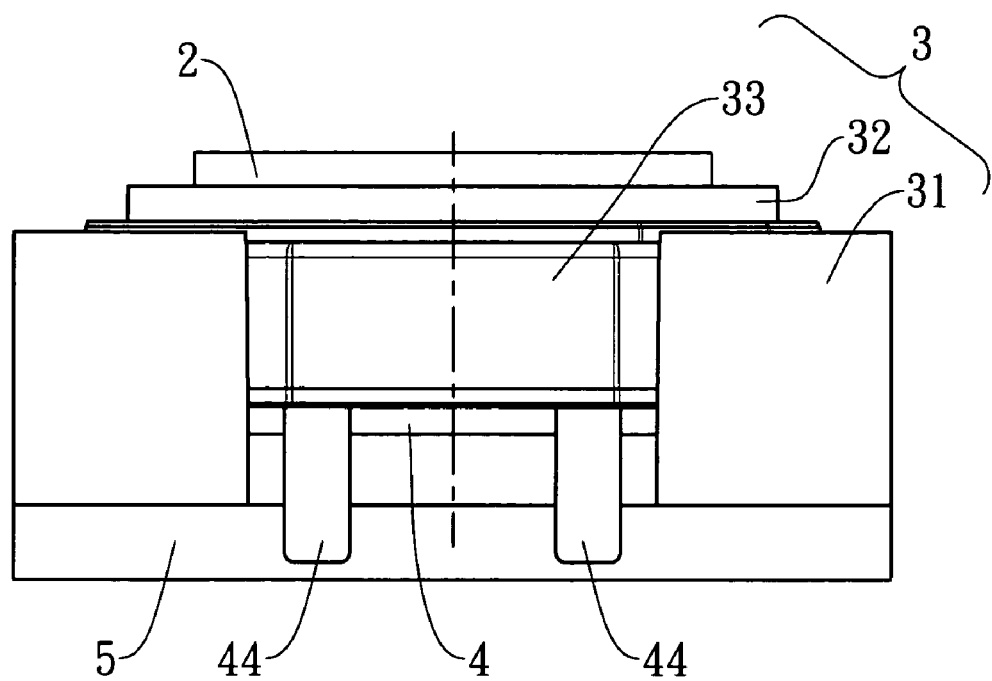
FIG. 4 shows a front view of a photographing module according to a first embodiment of the present invention.
Figure 5:
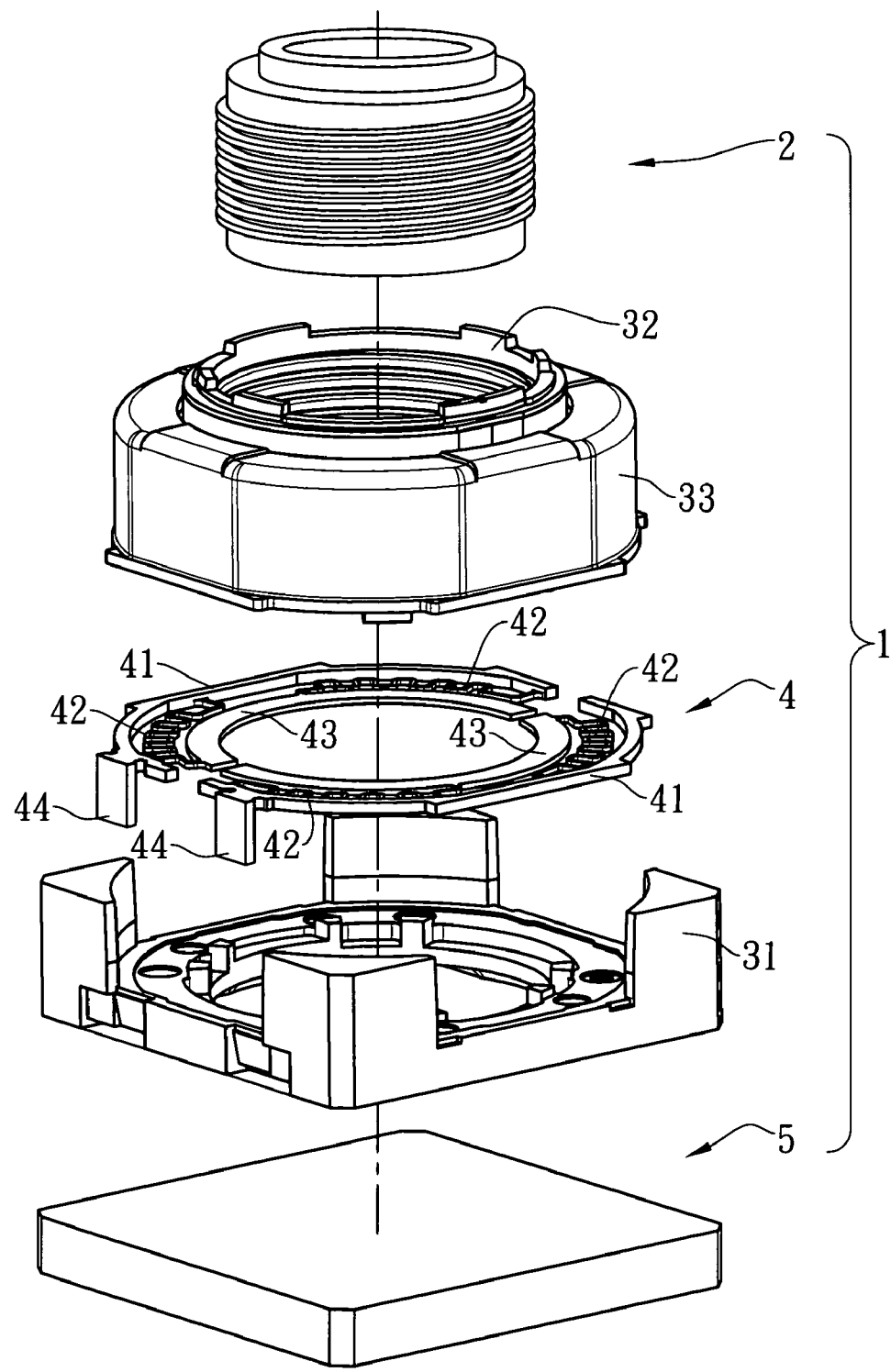
FIG. 5 shows an exploded perspective view of the photographing module according to the first embodiment of the present invention.

FIG. 4 shows a front view of an assembled photographing module 1 and FIG. 5 shows an exploded perspective view of the same according to a first embodiment of the present invention. The photographing module 1 at least includes a lens unit 2, an electrically controlled actuator 3, an elastic member 4, and a photo sensor 5. The lens unit 2 at least comprises one lens element. The electrically controlled actuator 3 at least comprises a fixed element 31, a movable element 32 which is positioned within the fixed element 31, has a hollow central portion around an optical axis and is connected to the lens unit 2, and an electrical unit 33 positioned around the outside of the movable element 32. The elastic member 4 at least comprises a fixed portion 41, an elastic portion 42 linked to the fixed portion 41, a movable portion 43 linked to the elastic portion 42 (i.e., the elastic portion 42 is linked between the fixed portion 41 and the movable portion 43), and a pair of power supply terminals 44 linked to the fixed portion 41. The photo sensor 5 is positioned on an image side of the photographing module 1 and connected to the fixed member 31 of the electrically controlled actuator 3.

The elastic member 4 is positioned between the fixed element 31 and the movable element 32 of the actuator 3. The elastic member 4 electrically communicates with the electrical unit 33 of the actuator 3. The fixed portion 41 of the elastic member 4 is connected to the fixed element 31 of the actuator 3. The movable portion 43 of the elastic member 4 is connected to the movable element 32 of the actuator 3. In the elastic member 4, moreover, the thickness of the fixed portion 41 is different from that of the elastic portion 42.

Figure 6:
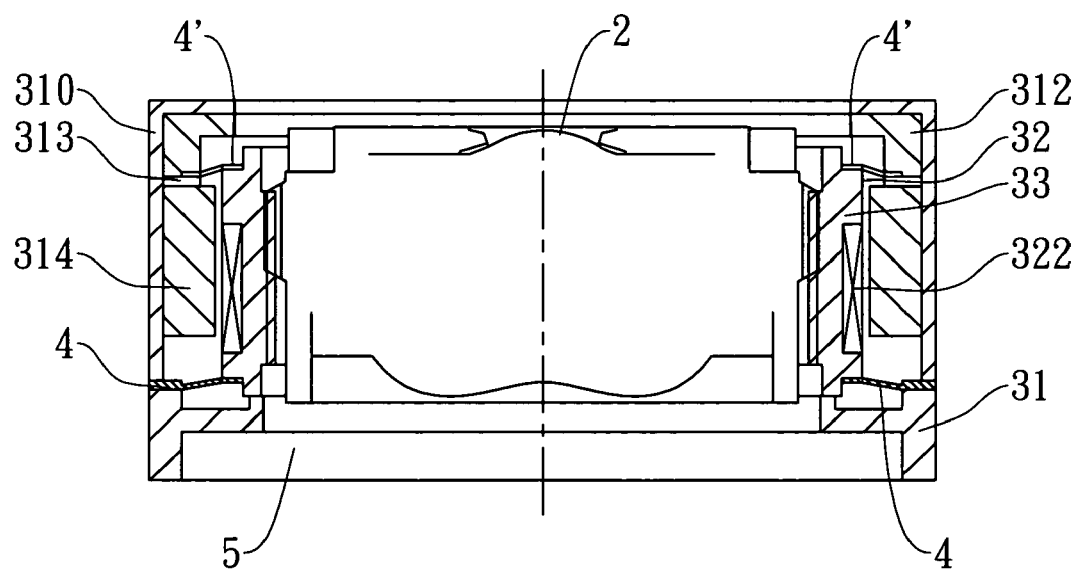
FIG. 6 shows a cross-sectional view of the photographing module in FIG. 4.

FIG. 6 is a cross-sectional view of the photographing module 1 in FIG. 4. Referring to FIGS. 4-6, the electrically controlled actuator 3 of the module further comprises a yoke 310 connected to the fixed portion 41 of the elastic member 4, a magnet 314 positioned at the inner wall of the yoke 310, and a coil 322 positioned at the outer wall of the movable element 32 and corresponding to the magnet 314. The photographing module 1 further includes a gasket 312 and an insulating piece 313 sequentially positioned between the yoke 310 and the magnet 314. The photographing module 1 includes an upper elastic member and a lower one; the lower elastic member 4' is positioned between the insulating piece 313 and the movable element 32. It should be noted that the yoke 310, gasket 312, insulating piece 313, and elastic member 4' as described above are not shown in FIG. 5. When power from an external power source (not shown) is input to the electrical unit 33 of the actuator 3 through the pair of power supply terminals 44, the coil 322 will generate a magnetic field because of the directed current. The magnetic field of the coil 322 then interacts with the magnetic field of the magnet 314, thereby creating a force that drives the movable element 32 to move. The movable element 32 of the actuator 3 driven by the force thus performs an axial displacement, which enables the lens unit 2 to move linearly along the optical axis to achieve autofocusing. Also, the displacement of the movable element 32 enables the movable portion 43 of the elastic member 4 to move, which leads to a linear displacement of the elastic portion 42.

Figure 7:
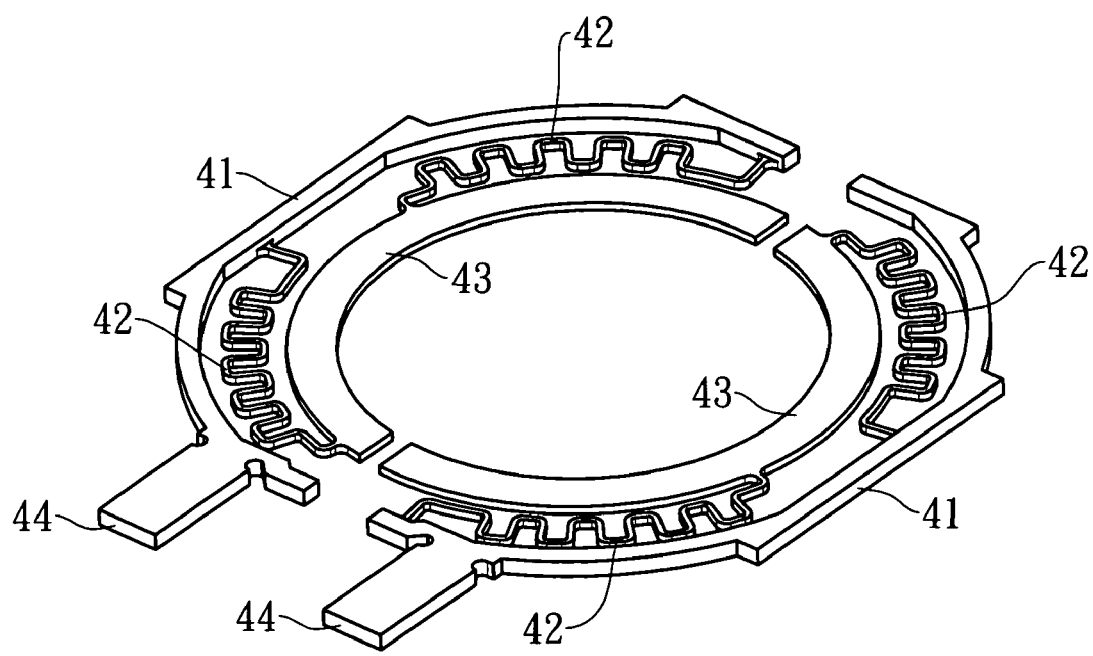
FIG. 7 shows a perspective view of an elastic member according to the present invention where its pair of power supply terminals are not bent.

FIG. 7 shows a perspective view of the elastic member 4 where its pair of power supply terminals 44 is not bent. Referring to FIGS. 5 and 7, the pair of power supply terminals 44 is formed integrally into the elastic member 4 to become one piece. Moreover, the various portions of the elastic member 4 have different thicknesses, so that both the stiffness of the terminals 44 and its stability after assembly are enhanced. This is because the terminals 44 are in a bending condition after the elastic member 4 and the electrically controlled actuator 3 are assembled and connected to each other. Thus, to avoid rupture under the bending condition and to maintain stability, it is necessary for the terminals 44 of elastic member 4 to have proper stiffness.

In the elastic member 4 of this embodiment, the thickness of the fixed portion 41 is different from that of the elastic portion 42. The various portions of the elastic member 4 may have different thicknesses depending on desired stiffness of each portion. During fabrication, for example, the elastic member 4 may first be formed by an etching process; here, the thickness of the base material provides the stiffness required for the structure of the elastic member. Next, half-etching is performed at some parts of the elastic member 4 to form the elastic portion 42 with a reduced thickness, thereby acquiring the desired spring constant for the elastic portion 42. In addition, the surface of the elastic member 4 may be covered with an insulating layer (not shown) using plating, so as to avoid electrical communication between the surface and other metal components (not shown). By coating the surface of the elastic member, there is no need for an insulating piece as used in the prior art technique, and the decrease in the number of components can help reduce the production cost.

Figure 8:
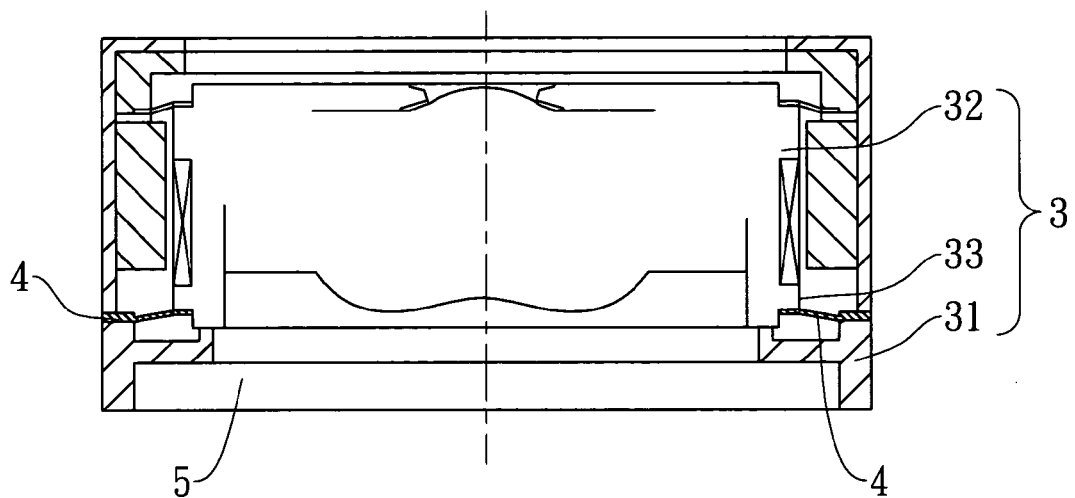
FIG. 8 shows a cross-sectional view of a photographing module according to a second embodiment of the present invention.

FIG. 8 shows a cross-sectional view of a photographing module 6 according to a second embodiment of the present invention. The photographing module 6 at least includes an electrically controlled actuator 3, an elastic member 4, and a photo sensor 5. The electrically controlled actuator 3 at least comprises a fixed element 31, a movable element 32 which is positioned within the fixed element 31 and comprises at least one lens element, and an electrical unit 33 positioned around the outside of the movable element 32. The elastic member 4 at least comprises a fixed portion 41, an elastic portion 42 linked to the fixed portion 41, a movable portion 43 linked to the elastic portion 42, and a pair of power supply terminals 44 linked to the fixed portion 41. The photo sensor 5 is positioned on an image side of the photographing module 6 and connected to the fixed member 31 of the electrically controlled actuator 3.

The photographing module 6 of the second embodiment and the photographing module 1 of the first embodiment are different in that the movable element 32 of the photographing module 6 at least includes one lens element. Descriptions concerning the components contained and their arrangement in the photographing module 6 will be omitted as those are the same with the photographing module 1.

In the photographing module 1 or 6 of the present invention, the electrically controlled actuator 3 may use a VCM or shape memory alloy structure; the elastic member 4 may be formed by an etching or electroforming process.

The photographing module of the present invention has the following advantages:

1. The power supply terminals are formed integrally into the elastic member to become one piece, and hence, the step of soldering terminals can be eliminated during assembly. As a result, the number of components, the difficulty caused during assembly, and the overall production cost can all be reduced.

2. To achieve the desired spring constant for the elastic member, the layout design and selection of material may be used to make adjustments, and also, controlling the degree of half-etching in forming the elastic portion may help the adjustment of the spring constant. With the elastic member having different thicknesses at various portions, the stiffness of the power supply terminals and the stability after assembly can be enhanced both.

3. The elastic member may be covered with an insulating layer using plating. Thus, electrical communication with other metal components can be avoided, and the number of components can be reduced as insulating pieces are not required. Meanwhile, the difficulty caused during assembly and the overall production cost can be reduced as well.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A photographing module, at least including a lens unit, an electrically controlled actuator, an elastic member, and a photo sensor, the lens unit at least comprising one lens element;

the electrically controlled actuator at least comprising:
 a fixed element,
 a movable element positioned within the fixed element, having, a hollow central portion around an optical axis, and connected to the lens unit, and an electrical unit positioned around the outside of the movable element;

the elastic member at least comprising:
 a fixed portion,
 a movable portion,
 an elastic portion linked between the fixed portion and the movable portion, and
 a pair of power supply terminals linked to the fixed portion; and the photo sensor being positioned on an image side of the photographing module and connected to the fixed member of the electrically controlled actuator, wherein the elastic member is positioned between the fixed element and the movable element of the actuator, the elastic member electrically communicates with the electrical unit of the actuator, the fixed portion of the elastic member is connected to the fixed element of the actuator, the movable portion of the elastic member is connected to the movable element of the actuator, and the fixed portion is integrally formed with the elastic portion as one piece such that the thickness of the fixed portion in a direction of optical axis of the lens unit is greater than that of the elastic portion; and wherein when power from, an external power source is input to the electrical unit through the pair of power supply terminals, an axial displacement of the movable element of the actuator is generated, which enables the lens unit to move linearly along the optical axis leading to the movement of the movable portion of the elastic member that enables the elastic portion to have a linear displacement.

2. The photographing module according to claim 1, wherein the elastic member is formed by an etching process.

3. The photographing module according to claim 1, wherein the elastic member is formed by an electroforming process.

4. The photographing module according to claim 1, wherein the electrically controlled actuator uses a VCM structure.

5. The photographing module according to claim 1, wherein the electrically controlled actuator uses a shape memory alloy structure.

6. The photographing module according to claim 1, wherein the surface of the elastic member is covered with an insulating layer using plating.

7. The photographing module according to claim 1, wherein the power supply terminals of the elastic member receive power from an external power source.

8. A photographing module, at least including an electrically controlled actuator, an elastic member, and a photo sensor,
the electrically controlled actuator at least comprising:
a fixed element,
a movable element positioned within the fixed element and at least comprising one lens element, and
an electrical unit positioned around the outside of the movable element;
the elastic member at least comprising:
a fixed portion,
a movable portion,
an elastic portion linked between the fixed portion and the movable portion, and
a pair of power supply terminals linked to the fixed portion; and
the photo sensor being positioned on an image side of the photographing module and connected to the fixed member of the electrically controlled actuator,
wherein the elastic member is positioned between the fixed element and the movable element of the actuator, the elastic member electrically communicates with the electrical unit of the actuator, the fixed portion of the elastic member is connected to the fixed element of the actuator, the movable portion of the elastic member is connected to the movable element of the actuator, and the fixed portion is integrally formed with the elastic portion as one piece such that the thickness of the fixed portion in a direction of optical axis of the lens element is greater than that of the elastic portion;
and wherein when power from an external power source is input to the electrical unit through the pair of power supply terminals, the moveable element of the actuator is enabled to move linearly along the optical axis and a linear displacement of the elastic portion of the elastic member is generated.

9. The photographing module according to claim 8, wherein the elastic member is formed by an etching process.

10. The photographing module according to claim 8, wherein the elastic member is formed by an electroforming process.

11. The photographing module according to claim 8, wherein the electrically controlled actuator uses a VCM structure.

12. The photographing module according to claim 8, wherein the electrically controlled actuator uses a shape memory alloy structure.

13. The photographing module according to claim 8, wherein the surface of the elastic member is covered with an insulating layer using plating.

14. The photographing module according to claim 8, wherein the power supply terminals of the elastic member receive power from an external power source.

* * * * *